US009658423B2

(12) United States Patent
Gustafson et al.

(10) Patent No.: US 9,658,423 B2
(45) Date of Patent: *May 23, 2017

(54) SPRINGLESS ATHERMAL LENS DESIGN WITH FLEXURED SPACER

(71) Applicant: DRS Network & Imaging Systems, LLC, Melbourne, FL (US)

(72) Inventors: Eric J. Gustafson, Celeste, TX (US);
Jeff R. Emmett, Sachse, TX (US);
Rachel L. Cooper, Wylie, TX (US);
Samuel E. Ivey, Richardson, TX (US);
Rohan G. Rodney, Dallas, TX (US);
Brian R. Pekarek, Fairview, TX (US);
Patrick J. Cronkite, Palm Bay, FL (US); Mark E. Durham, Palm Bay, FL (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,754

(22) Filed: Sep. 29, 2015

(65) Prior Publication Data

US 2016/0018619 A1 Jan. 21, 2016

Related U.S. Application Data

(63) Continuation of application No. 14/050,289, filed on Oct. 9, 2013, now Pat. No. 9,176,298, which is a
(Continued)

(51) Int. Cl.
*G02B 7/00* (2006.01)
*G02B 7/02* (2006.01)
*H04N 5/225* (2006.01)

(52) U.S. Cl.
CPC ............. *G02B 7/008* (2013.01); *G02B 7/026* (2013.01); *G02B 7/028* (2013.01); *H04N 5/2254* (2013.01)

(58) Field of Classification Search
CPC .................................. G02B 7/26; G02B 7/28
See application file for complete search history.

(56) References Cited

U.S. PATENT DOCUMENTS 6,631,040 B1 10/2003 Cox
8,102,424 B2 1/2012 Sheard et al.
(Continued)

OTHER PUBLICATIONS

Non-Final Office Action mailed Mar. 16, 2015 in U.S. Appl. No. 14/050,289, 13 pages.
(Continued)

*Primary Examiner* — Clayton E Laballe
*Assistant Examiner* — Noam Reisner
(74) *Attorney, Agent, or Firm* — Kilpatrick Townsend & Stockton LLP

(57) ABSTRACT

Embodiments of the invention are directed to a springless athermal lens assembly. In one embodiment, a spacer of a springless athermal lens assembly may compensate for defocus of the camera system due to thermal expansion of the lens assembly through the coupling of a spacer to an inner barrel and an outer barrel. The inner barrel comprises a lens cell assembly and a body. The outer barrel comprises a body. The spacer comprises a body having an inner surface and an outer surface. The outer surface of the spacer body is configured to be physically coupled to outer barrel body and the inner surface of the spacer body is configured to be physically coupled to the inner barrel body. A retainer ring is configured to engage with the outer surface of the spacer body and provide a radial force against the outer surface of the spacer body to securably engage the inner surface of the spacer body with the inner barrel body.

20 Claims, 10 Drawing Sheets

Related U.S. Application Data continuation of application No. 14/046,755, filed on Oct. 4, 2013, now abandoned.

(60) Provisional application No. 61/709,958, filed on Oct. 4, 2012.

(56) References Cited

U.S. PATENT DOCUMENTS

| | | | |
|---|---|---|---|
| 8,110,973 B2 | 2/2012 | Richard et al. | |
| 9,176,298 B1 * | 11/2015 | Gustafson | G02B 7/028 |
| 2006/0193064 A1 | 8/2006 | Kim | |
| 2010/0165188 A1 | 7/2010 | Jannard | |
| 2012/0133825 A1 | 5/2012 | Nakajima et al. | |

OTHER PUBLICATIONS

Notice of Allowance mailed Jun. 29, 2015 in U.S. Appl. No. 14/050,289, 7 pages.

Notice of Allowance mailed Jul. 17, 2015 in U.S. Appl. No. 14/050,289, 4 pages.

* cited by examiner

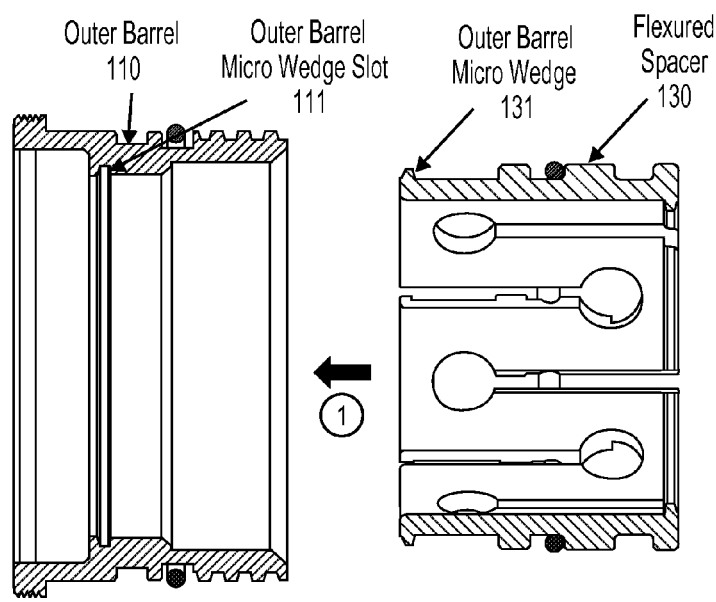
FIG. 8A
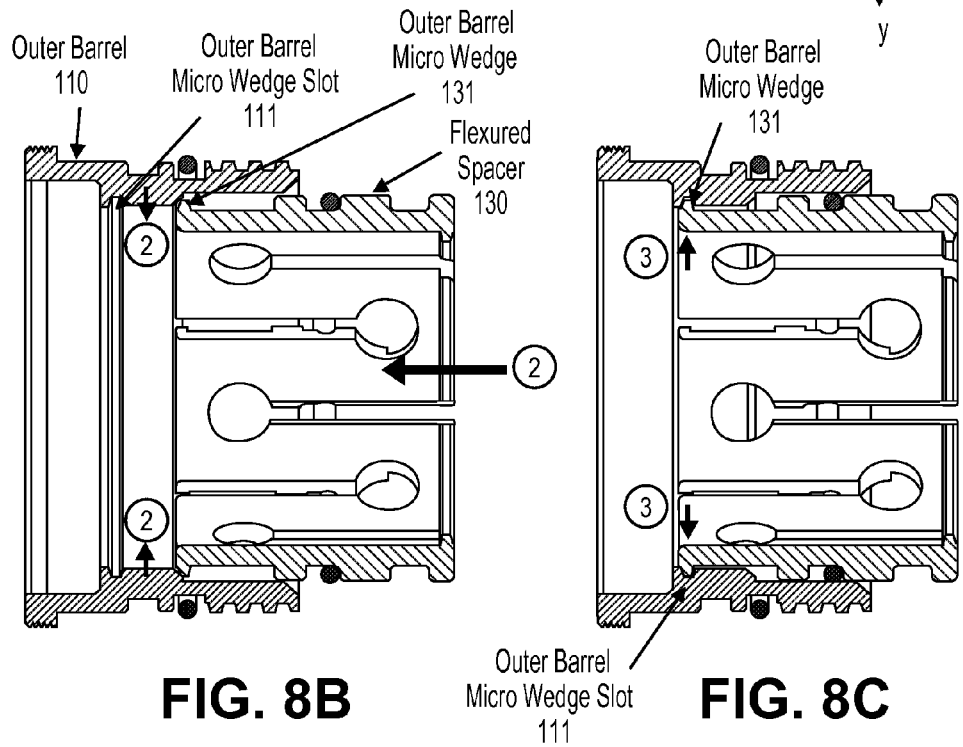
FIG. 8B   FIG. 8C

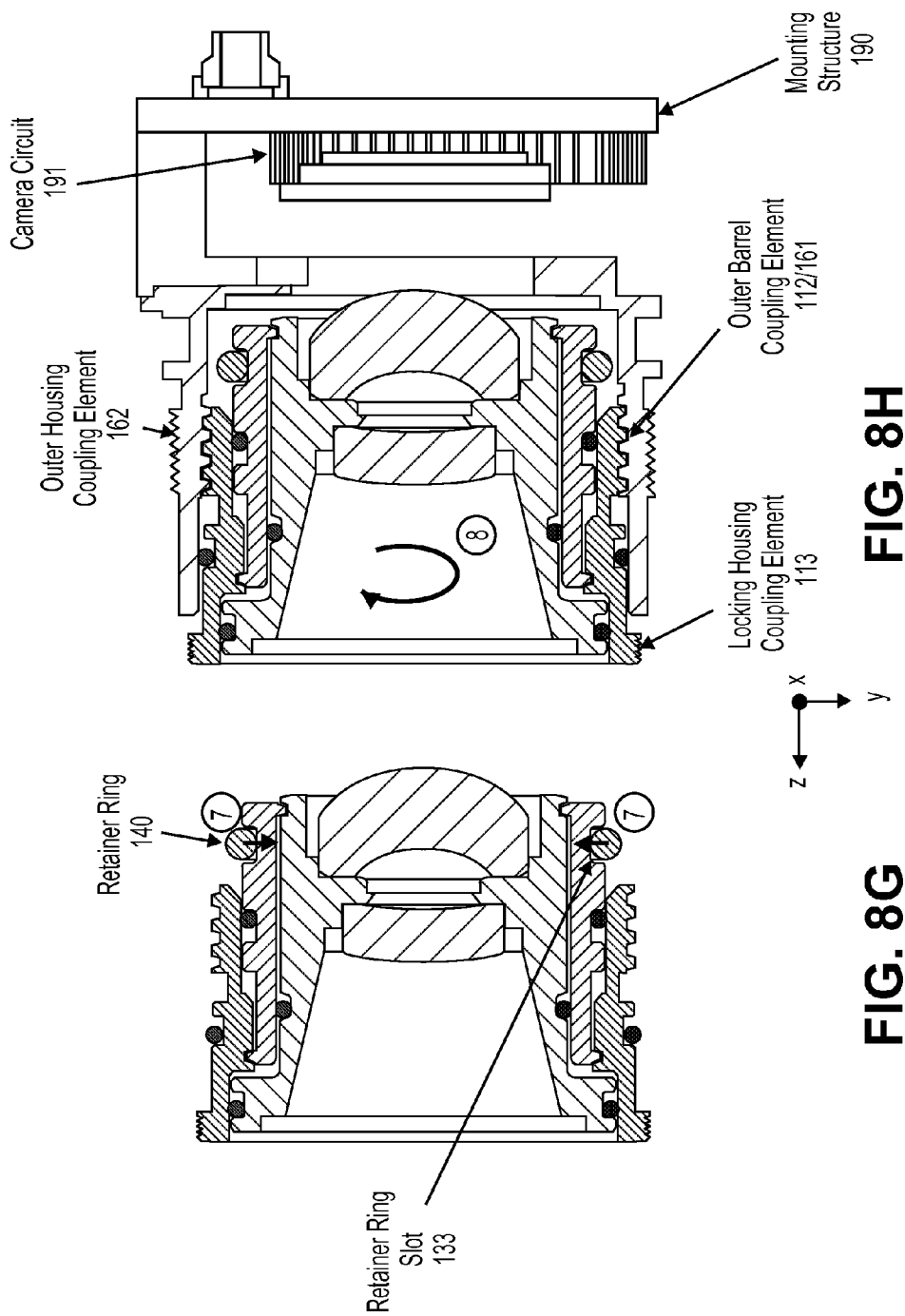

SPRINGLESS ATHERMAL LENS DESIGN WITH FLEXURED SPACER

CROSS-REFERENCES TO RELATED APPLICATIONS

This application is a continuation of U.S. patent application Ser. No. 14/050,289, filed Oct. 9, 2013, which is a continuation of U.S. patent application Ser. No. 14/046,755, filed Oct. 4, 2013, which is a non-provisional of and claims priority to U.S. Provisional Patent Application No. 61/709,958, filed on Oct. 4, 2012, the disclosures of which are hereby incorporated by reference in their entirety for all purposes.

BACKGROUND

Athermal lens design is common in the optics industry. Athermal lenses are designed to maintain focus across an expected or required operational temperature range. For example, International Application No. PCT/EP2012/076,332, filed internationally Dec. 20, 2012, which is hereby incorporated by reference in its entirety for all purposes, describes an athermal lens arrangement and the optical features and principles of such arrangements. In typical athermal lens designs, a spring is used to preload a thermal spacer against a lens cell and the spacer is sized such that its length combined with its coefficient of thermal expansion (CTE) allows the lens to stay in focus across the expected or required operational temperature range of the camera. This type of design is typically used in infrared cameras, night vision optics, and can also be applied to the focus of the input beam into the optical parametric oscillator (OPO) in a laser system.

However, the necessity of springs in typical athermal lens designs lead to a number of problems. For example, the added steps of assembly of the spring, the lack of room in a compact design for the added parts, and the extra cost of including and accommodating for the spring. Additionally, reliability of the system may be impacted by the additional spring element in the design.

Embodiments of the present invention are directed to solving these and other problems, individually and collectively.

SUMMARY

Embodiments of the present technology use a spacer to compensate for the thermal expansion and contraction of a lens assembly by implementing a micro wedge mechanism that pushes and pulls the inner and outer barrels to change the focal length of the lens cell. Accordingly, embodiments of the present invention are directed to a springless athermal lens design with a flexured spacer.

The springless athermal lens assembly comprises an inner housing, an outer barrel, a thermal spacer (referred to as a "spacer"), an inner barrel comprising a lens cell assembly, a retainer ring, an outer housing, a locking housing, and a number of o-rings to ensure proper fit and function. The inner housing and the outer barrel are physically coupled with a coupling mechanism. The spacer may be configured to be physically coupled to both the inner barrel and the outer barrel through a micro wedge mechanism designed to snap fit into micro wedge slots of the inner and outer barrels. The spacer snaps into place when coupled to the inner barrel and outer barrel and physically couples the inner barrel and the outer barrel. As temperature changes and the components of the lens assembly expand and contract, the length of the spacer may change and the micro wedge mechanism may push and pull the inner and outer barrels to compensate for defocus of the lens cell assembly due to thermal expansion and contraction. Accordingly, when the micro wedge mechanisms are engaged, the springless athermal lens design provides a sealed assembly that is both gas and water-tight. Therefore, a zero clearance thermal compensation cylinder is provided without the use of a spring, as in typical designs. Additionally, the lens assembly may be quickly and easily snapped together instead of requiring intricate and detailed labor or a customized fitting.

A springless athermal design provides a number of advantages including reduced assembly time, reduced assembly cost, reduced part count, and increased reliability. Reliability is increased because in typical athermal lens designs implementing springs, a plastic spacer is subject to stress deformation or "creep" from the preload, especially when at the high end of the temperature range, as the components are at their maximum length. The maximum length creates the highest load on the system by compressing the spring, and additionally, the material properties of most plastics see a reduction in "creep strength" as temperature is increased. Furthermore, the design is robust and may easily stand up to environmental forces from robust or extreme applications including vibration as well as installation stresses.

One embodiment of the technology is a springless athermal lens assembly including an inner barrel, an outer barrel, and a spacer. The inner barrel comprises a lens cell assembly and an inner barrel body having an inner barrel micro wedge slot. The outer barrel comprises an outer barrel body having an outer barrel micro wedge slot. The spacer comprises a spacer body having an inner barrel micro wedge and an outer barrel micro wedge. The spacer is configured to be physically coupled to the inner barrel through engagement of the inner barrel micro wedge and the inner barrel micro wedge slot. Further, the spacer is configured to be physically coupled to the outer barrel through the engagement of the outer barrel micro wedge and the outer barrel micro wedge slot.

Another embodiment is directed to an athermal camera system comprising a mounting structure. The mounting structure comprises a focal circuit card and a springless athermal lens assembly. The springless athermal lens assembly comprises an inner housing, an inner barrel, an outer barrel, and a spacer. The inner housing comprises a barrel housing and a base physically coupled to the barrel housing, the base configured to securably couple to the mounting structure. The inner barrel comprises a lens cell assembly and an inner barrel body having an inner barrel micro wedge slot. The outer barrel comprises an outer barrel body having an outer barrel micro wedge slot. The outer barrel is configured to securably couple to the inner housing. The spacer comprises a spacer body having an inner barrel micro wedge and an outer barrel micro wedge. The spacer is configured to be physically coupled to the inner barrel through engagement of the inner barrel micro wedge and the inner barrel micro wedge slot. Further, the spacer is configured to be physically coupled to the outer barrel through the engagement of the outer barrel micro wedge and the outer barrel micro wedge slot.

Another embodiment is directed to a method of making an athermal lens assembly comprising connecting a spacer comprising an inner barrel micro wedge and an outer barrel micro wedge to an outer barrel comprising an outer barrel micro wedge slot to form an intermediate assembly. The method further comprises connecting the intermediate assembly to an inner barrel comprising a lens cell assembly and an inner barrel micro wedge slot.

Additional embodiments and features are set forth in part in the description that follows, and in part will become apparent to those skilled in the art upon examination of the specification, or may be learned by the practice of the disclosed embodiments. The features and advantages of the disclosed embodiments can be realized and attained by means of the instrumentalities, combinations, and methods described in the specification.

BRIEF DESCRIPTION OF THE DRAWINGS

FIG. 6A shows an inner barrel of the springless athermal lens assembly before it is snapped into place using the inner barrel micro wedge and slot mechanism connection between a spacer and the inner barrel. FIG. 6B shows the springless athermal lens assembly after being snapped into place using the inner barrel micro wedge and slot mechanism.

FIGS. 8A-8H show a series of elevational cross-section views of a method of making an athermal lens array, according to an exemplary embodiment of the present technology.

Figure 1:
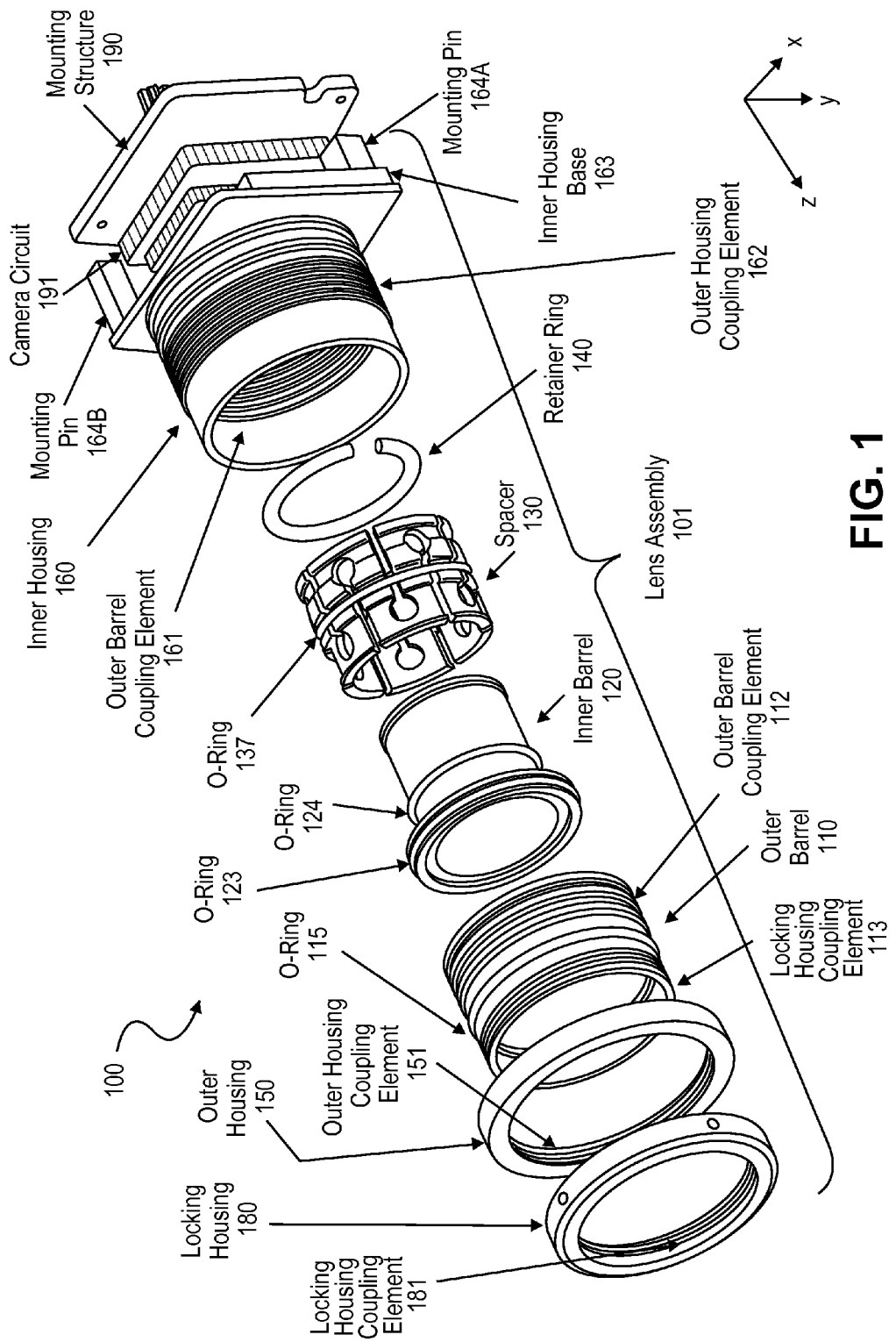
FIG. 1 shows an exploded view of a springless athermal camera system, according to an exemplary embodiment of the present technology.

In the appended figures, similar components and/or features may have the same numerical reference label. Further, various components of the same type may be distinguished by following the reference by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Embodiments of the present invention are directed to a springless athermal lens assembly. In one embodiment of the present technology, a thermal spacer may compensate for defocus of a lens assembly due to thermal expansion of components of the lens assembly through the use of wedge mechanisms coupling the spacer to an inner barrel and an outer barrel. In another embodiment, a snap fit geometry including a flexured spacer may be used to hold the components of the athermal lens assembly including an inner barrel, the flexured spacer, and an outer barrel into place.

In traditional athermal lens assemblies and camera systems, a spring may be used to compensate for thermal expansion of components in a camera by pressing a barrel or other component holding a lens cell assembly into a correct position to compensate for any thermal expansion or contraction. For example, the spring may move an inner barrel back and forth as temperature changes cause expansion or contraction of the inner barrel, spacer, camera housing, or any other components that affect the focal point of the lens cell assembly. Accordingly, a spring may move the inner barrel back and forth as temperature changes.

A thermal spacer may expand and contract according to the material properties (i.e., thermal coefficient of expansion) of the spacer. For example, at room temperature (e.g., 70 degrees Fahrenheit) an athermal lens assembly may be assembled and focused on a camera circuit card, focal circuit card, or other image receiving device. However, as temperature changes during use of the camera system (e.g., at a temperature of −20 degrees Fahrenheit) the materials of each component may contract such that each components position may change, thus defocusing the camera system. Furthermore, if the components are made of different materials, some materials may compress more or less than others depending on the coefficient of thermal expansion (CTE) of each material. Accordingly, the various components of the lens array may move in relation to the focal circuit and may defocus the resulting image.

Embodiments of the present invention use micro wedge coupling mechanisms to move the inner barrel and outer barrel of a lens assembly to compensate for thermal expansion, instead of a spring. Accordingly, embodiments do not need a spring because the wedge mechanisms of the spacer move the components of the lens array instead of the force from a spring. The length of the spacer (also referred to as a "spacer length") may change with temperature according to the coefficient of thermal expansion of the material of the spacer and the change in spacer length may move the inner barrel and the outer barrel to automatically move the focal point of the lens cell assembly to match the defocus due to thermal expansion of other components of the lens assembly. The spacer is designed to a particular length based on the material properties of the material it is made out of as well as the lens prescription of the lens cell assembly. Thus, If the lens prescription were changed (e.g., the curvatures of the surfaces), the spacer length may change as well. However, the principles of the design described herein may still be used to provide correction of thermal shift for the camera system.

Accordingly, the micro wedge coupling mechanisms provide a number of advantages including removing the need for a spring. Therefore, the micro wedge mechanisms result in a more reliable lens assembly as well as provide an athermal lens assembly that is easier to install, make, manufacture, and/or package. Additionally, the micro wedge coupling mechanisms reduce part count and result in athermal lens assemblies that are faster and cheaper to make.

Furthermore, in some embodiments, the spacer may be flexurized so that it can press fit or "snap" into place with the inner barrel and outer barrel. Flexure features at each end of the thermal spacer may be implemented in order to allow for the snap or press fit of present embodiments. The spacer may then be locked in place using a clamping device including, for example, a retainer ring, o-ring, or wire clip. The snap fit configuration of the flexured spacer provides additional advantages including providing a more secure fit between the components as well as providing methods for easier and more efficient making, installation, and/or manufacturing of the lens assembly.

FIG. 1 shows an exploded view of an athermal camera system 100 including a springless athermal lens assembly 101, according to an exemplary embodiment of the present technology. The athermal camera system 100 includes a springless athermal lens assembly 101 and a mounting structure 190 having a focal circuit card 191.

The springless athermal lens assembly 101 comprises an outer barrel 110, an inner barrel 120, a spacer 130, a retainer ring 140, an outer housing 150, an inner housing 160 (i.e., a camera housing) coupled to one or more mounting pins 164, and a locking housing 180. As will be described in further detail below, many of the components may include one or more o-rings in order to ensure an air and water tight coupling between components. The components of the lens assembly may be in the form of a ring or a hollow cylindrical shape such that light may pass through the center of the springless athermal lens assembly 101 and be received through a lens cell assembly (not shown) located in the middle of the inner barrel 120 of the lens assembly 101. The lens cell assembly may then focus the light on a focal circuit card coupled to a mounting structure 190.

The components of the athermal camera system (excluding the mounting structure 190) may comprise a series of rings or hollow cylinders with a variety of diameters that are configured to at least partially nest or couple between one another. The inner barrel body may have the smallest diameter and may be configured to remain open and allow light to travel through the barrel and into a lens cell assembly. However, the front end or front edge of the inner barrel 120 may comprise a lip or other larger diameter ring end that may have a larger diameter then the rest of the inner barrel 120. Accordingly, the front end of the inner barrel 120 may have a larger diameter than the rest of the inner barrel 120. However, more than half of the axial length of the inner barrel 120 may comprise the smallest diameter of any components of the lens assembly. Therefore, other components (e.g., the spacer 130 and a retainer ring 140 coupled to the spacer 130) may have a smaller diameter than the front end of the inner barrel 120 but may fit over or have a larger diameter than the majority of the inner barrel 120.

The diameter of the inner surface of the spacer 130 may be configured to fit over the outer surface of the inner barrel 120 such that the inner barrel 120 may physically nest into the spacer 130. Accordingly, the spacer body 130 may have a larger diameter than the inner barrel 120. However, the spacer body 130 may also nest with the outer barrel 110 and thus may have a smaller diameter than the inner surface of the outer barrel 110. Further, the spacer body 130 may comprise a retainer ring slot 133 that is configured to securably couple to a retainer ring 140. A retainer ring 140 may have an inner surface diameter that is slightly smaller than the spacer 130 but is large enough to fit over the edge of the spacer 130 and exert a radial force on the edge of the spacer 130 toward the inner barrel 120 when secured to the spacer 130. The combined outer diameter of the retainer ring 140 and the spacer 130 may be smaller than the inner diameter of the inner housing 160 such that when secured to the spacer 130, the retainer ring 140 fits between the spacer 130 and the inner housing 160. Additionally, the retainer ring 140 may comprise a gap or discontinuity to aid in securing the retainer ring 140 into a radial retainer ring slot 133 of the spacer 130.

Further, the inner housing 160 may have a diameter that is larger than the outer barrel 110 such that the outer barrel 110 may nest or fit within the inner housing 160. The outer surface of the inner housing 160 may have a smaller diameter than an inner surface of an outer housing 150. Accordingly, the outer housing 150 may be configured to fit over and physically couple with the outer surface of the inner housing 160 and may have the largest diameter of the components in the athermal lens assembly. The diameter of the outer surface of the inner housing 160 and the diameter of the inside surface of the outer housing 150 may be configured to physically couple through outer housing coupling elements 151, 162.

Additionally, the athermal lens assembly may comprise a locking housing 180 that may have a larger diameter than the outer barrel 110 and may be configured to couple with the front end or edge of the outer barrel 110 through a set of locking housing coupling elements 181, 113. However, the diameter of the inner surface of the locking housing 180 may be smaller than the diameter of the outer surface of the inner housing 160 such that the locking housing 180 may not fit over the inner housing 160. Instead, when fully engaged, the locking housing 180 may abut or physically couple with the front end of the inner housing 160. Accordingly, the locking housing 180 may be used to securably couple the components of the lens assembly together.

The various components of the lens assembly 101 may be made of any suitable material (e.g., an aluminum alloy, stainless steel, plastic, etc.) but the materials used may impact the design of the athermal lens assembly 101. In particular, the material of the thermal spacer 130 may be particularly important to providing the athermal lens assembly 101 described herein. Accordingly, the spacer 130 may be made of special materials with particular coefficients of thermal expansion (CTE). Spacers can vary across a large range of coefficients of thermal expansion. For example, a spacer 130 may be manufactured using Delrin™, a specialty plastic. Some athermal designs use "invar" or "super invar" materials with CTEs on the order of zero. Others use high CTE's which are typically used to help offset large movements of lens assemblies across temperature. These ranges are typically found in plastic materials and can range from $20 \times 10^{-6}$ to $200 \times 10^{-6}$ or higher. One key element to the selection of the material is that the CTE of the material is relatively linear across the expected operating temperature range for the optical system. For example, Teflon® has a good CTE for use with aluminum systems but has a somewhat nonlinear curve with respect to temperature. Additionally, materials that may be used with other components (e.g., housings and barrels) are an aluminum alloy. The aluminum alloy may further be anodized with Teflon™ impregnate or any other strengthening materials. One of ordinary skill may recognize other materials including plastics and metals that may be used with the lens assembly design used herein.

The materials used for the various components of the lens assembly may be selected based on (a) materials properties (e.g., CTE, tensile strength, compressive strength, etc.) and (b) lengths and configuration of the various components. The length of the spacer 130 may be sized properly so that as temperature changes, the material of the spacer 130 shifts the focal point of the lens array in line with the shift from the expansion of the other materials in the camera system. Accordingly, the delta in the change of the length of the spacer 130 (and subsequently the delta in the movement of the inner and outer barrels), which may be on the order of thousandths of inches, provides the delta of the amount of defocus of the image. Therefore, the defocus is compensated for by the shift in the length of the thermal spacer.

The length and configurations of the various components may include, for example, the focal length of the lens cell assembly and the shape and material properties of the camera housing. The material of the inner housing 160 (also referred to as the "camera housing") may be a driving factor for the length of the spacer 130 as the expansion and contraction of the inner housing 160 moves the focal point array with respect to the lens prescription. As the camera housing expands or contracts, the expansion and/or contraction moves the rest of the components including the lens array and the subsequent focal point of the lens array. Accordingly, the camera housing shape and material may determine the length of the spacer 130 and the spacer 130 may compensate for the focal point shift by moving the inner barrel 120 and the outer barrel 110 as the length of the spacer 130 changes due to temperature change. Accordingly, the length of the spacer 130 may be dependent on the entire design of the camera and the design shown in FIG. 1 is merely one example of designs that may be possible using embodiments of the present invention.

The lens cell assembly (shown in FIG. 2) may be configured to focus received light into an image that is captured on a camera circuit 191, focal circuit, focal sensor, and/or electrical circuit coupled to a mounting structure 190. Accordingly, the mounting pins or other coupling mechanisms may be configured such that when the lens cell assembly is securably coupled to the mounting structure 190, a focal point of the lens cell assembly is positioned on the camera or focal circuit card 191. The spacer 130 of the athermal lens assembly 101 may further be configured such that the focal point of the lens cell assembly 101 is fixed on the focal circuit card 191 across a specified range of temperatures through the expansion of a length of the spacer 130 to compensate for the expansion and contraction of the materials used to manufacture the various components in the camera system.

The spacer 130 may be configured to securably snap into place when coupled to both the inner barrel 120 and the outer barrel 110 and the position of the spacer 130 may be fixed in relation to the inner and outer barrel 110 once the spacer 130 is securably snapped into place. However, the length of the spacer 130 may change with temperature and a relative distance between a front edge of the outer barrel 110 and the back edge of the inner barrel 120 may change with the length of the spacer 130 according to a co-efficient of thermal expansion of the material used in the spacer 130.

The mounting structure 190 may be coupled to a larger system, component, housing, or any other structure or system (not shown) suitable for an application of the athermal camera system. For example, the mounting structure 190 may be coupled to a security camera housing (not shown), a larger system housing (e.g., a weapons system, a vehicle, etc.) or any other suitable system housing (not shown). The lens cell assembly may focus light on the camera circuit of the mounting structure 191 and the perceived image may be converted into digital information and may be transferred to another computer that may be a part of a larger system or otherwise transmitted to an image processor (not shown) outside of the lens assembly. Alternatively, the outer housing 150 may be used to couple the camera system to a larger housing that is part of a larger system (not shown).

The various components of the athermal lens assembly 101 may be described in further detail in FIGS. 2-8 which show the various components of the lens assembly in various stages of assembly and from various angles. Accordingly, the various elements may be referenced in a number of different figures. Respective components share element numbers between the various figures and any figure may be used to describe the functionality, capabilities, and structures of the various components.

Figure 2:
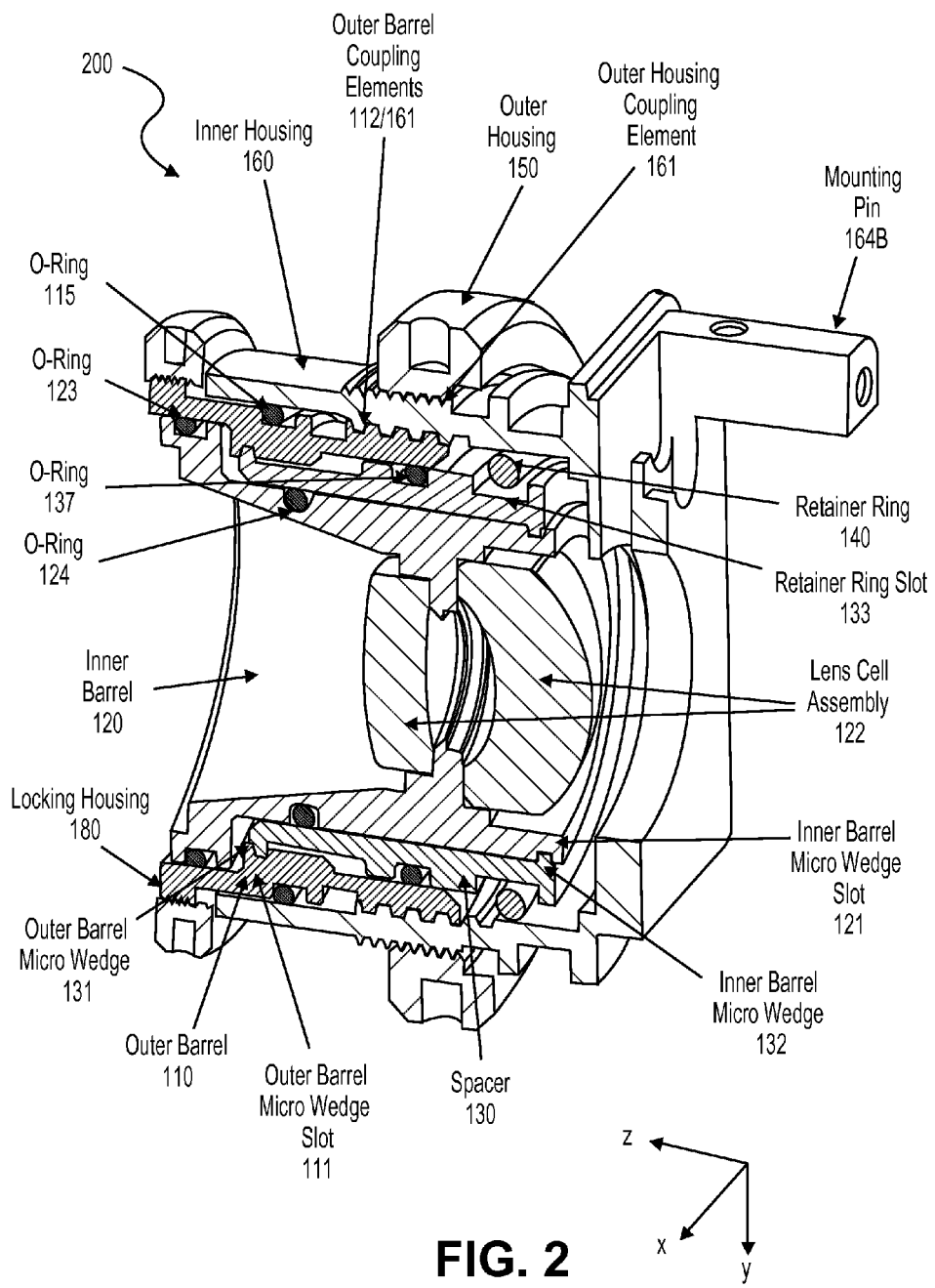
FIG. 2 shows a perspective view of a cross-section of a springless athermal lens assembly, according to an exemplary embodiment of the present technology.
Figure 3:
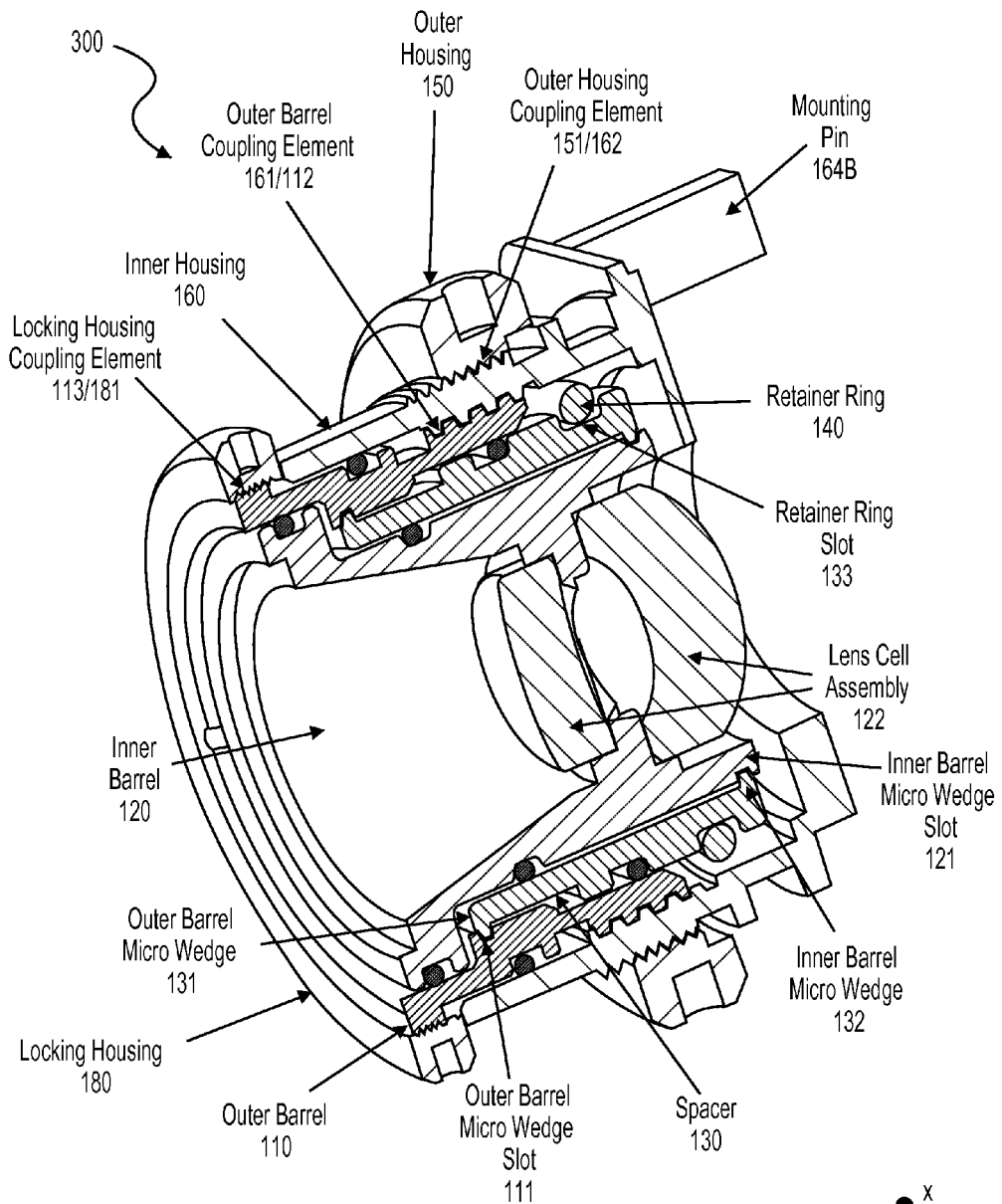
FIG. 3 shows another perspective view of a cross-section of a springless athermal lens assembly, according to an exemplary embodiment of the present technology.

FIGS. 2-3 show perspective views of a cross-section of an assembled springless athermal lens assembly 101, according to an exemplary embodiment of the present technology. The coupling of the elements in the springless athermal lens assembly 101 may be more clearly seen and may be described in further detail while referring to FIGS. 2-3.

The inner barrel 120 may include a lens cell assembly 122 and an inner barrel body. The inner barrel body may be in the shape of a tapered cylinder or ring that has a front wide end (i.e., larger diameter) at the front edge of the inner barrel 120 and a narrow opening (i.e., smaller diameter) at one or more lens engagement portions in the rear half of the inner barrel 120. The diameter of the front and the rear of the inner housing 160 are determined according to a lens prescription of the lens cell assembly 122 and the diameters of the lenses of the lens cell assembly 122. Accordingly, although the diameter of the inner barrel body 120 is tapered from a wide opening at the front of the inner barrel 120 towards a smaller diameter at one or more lens engagement portions comprising a lens cell assembly 122 at the middle to rear of the inner barrel 120, the diameter of the inner barrel 120 may maintain a uniform diameter after the lens engagement portion in order to allow for the rear lens of the lens cell assembly 122 to be properly positioned within the inner barrel 120. Additionally, the outer surface area of the inner barrel 120 may maintain a uniform diameter for the majority of the length of the inner barrel 120 so that it may fit or nest within a spacer 130.

The inner barrel 120 may comprise a lens cell assembly 122 and may be configured to securably hold one or more camera lenses of the lens cell assembly 122 in a fixed position according to a predetermined lens prescription based on the design of the camera system 100. The lens cell assembly 122 may be positioned at the most narrow section (i.e., one or more lens engagement portions) of the body of the inner barrel 120 and may be coupled to the inner barrel 120 through any suitable method. For example, the lens cell assembly 122 may be pre-fabricated and molded as part of the inner barrel 120, glued, welded, pressed, or any other manufacturing process to securably couple the lens cell assembly 122 into one or more lens engagement portions of the inner barrel 120 (e.g., one or more formed portions to allow for fitting of the front and rear lenses of the lens cell assembly 122). The narrow lens engagement portion of the inner barrel 120 may be configured to be roughly the size of the lenses in the lens cell assembly 122 such that all of the light that passes through the narrow portion of the inner barrel 120 is pushed through the lenses of the lens cell assembly 122. Furthermore, a rear lens may have a larger diameter than the front lens and thus the rear lens engagement portion may be wider than the front lens engagement portion. The lens cell assembly 122 of the present invention is merely an example and any suitable lens prescription may be implemented according to principles of the present invention. Lens cell assemblies and methods of manufacturing, producing, and coupling such lens cell assemblies into a lens barrel are well known in the art. Accordingly, specific details regarding the processing and selection of the lens cell assembly 122 will not be provided herein.

The body of the inner barrel 120 may be configured to couple with one or more o-rings 124, 123 to ensure air-tight and water-tight physical couplings between the spacer 130 and the outer barrel 110 of the lens assembly, respectively. An o-ring, also known as a packing or a toric joint, is a mechanical gasket that is designed to be seated in a groove or slot and compressed during assembly between two or more parts, creating a seal at the interface. As shown in FIG. 1, the inner barrel body may comprise an o-ring slot at the front edge of the inner barrel 120. An o-ring slot may be a radial slot that has a depth that is smaller than the diameter of an o-ring so that the o-ring may sit in the o-ring slot and at least a portion of the o-ring may physically couple a second component, creating an air and liquid-tight seal. For example, the inner barrel 120 may comprise an o-ring 123 located at the front end of the inner barrel 120 that is designed to fit snugly with the front edge of an outer barrel 110. However, the front edge of the inner barrel 120 may not create an air-tight or water-tight seal with the front edge outer barrel 110. Accordingly, a top portion of the o-ring 123 may extend from the o-ring slot and may physically couple with the inside surface of the outer barrel 110 to create an air-tight and water-tight coupling between the inner barrel 120 and the outer barrel 110. Such a coupling can be seen in FIGS. 2 and 3 where the o-ring 123 is physically touching both the inner barrel 120 and the outer barrel 110.

Similarly, an o-ring 124 may be provided between the inner barrel 120 and the spacer 130. The inner barrel 120 may comprise an o-ring slot near the middle of the length of the inner barrel 120. Again, the o-ring slot is a radial slot with a depth that is smaller than the diameter of the o-ring. Accordingly, some portion of the o-ring 124 extends vertically along a y axis out of the radial o-ring slot. Therefore, a portion of the o-ring 124 may physically touch both the body of the inner barrel 120 and the spacer 130. Accordingly, a radial force may be applied to the spacer 130 by the o-ring 124, ensuring that the wedge mechanism provides a tight and secure coupling between the inner barrel 120 and spacer 130, as will be explained in further detail below.

Additionally, the inner barrel body comprises an inner barrel micro wedge slot 121 of a micro wedge mechanism that is configured to engage a micro wedge 132 of a spacer 130 (also referred to as an "inner barrel micro wedge"). The operation of the micro wedge mechanism is described in further detail below in reference to FIGS. 4-5B. FIG. 5A shows a close up of an exemplary micro wedge mechanism including a micro wedge 131 and a micro wedge slot 111 while engaged. A micro wedge slot may be a radial slot or groove that has a depth that roughly matches the extended radial length of a micro wedge from a body. A micro wedge includes a wedge, tab, lip, phalange, or any other extending portion that extends radially inward or outward from a body of a spacer 130, depending on the configuration and placement of the micro wedge slot.

The inner barrel 120 may be physically coupled to the spacer 130 through a micro wedge mechanism that comprises elements from both the inner barrel 120 and the spacer 130. The micro wedge mechanism securably couples an inner barrel micro wedge slot 121 of the inner barrel 120 and an inner barrel micro wedge 132 of the spacer 130. Although the inner barrel micro wedge slot 121 and inner barrel micro wedge 132 are located at the rear of the athermal lens assembly 101, in some embodiments it may be possible to switch the location of the inner and outer wedge mechanism.

The outer barrel 110 may comprise an outer barrel body that is in the shape of a cylinder and may be configured to physically couple to a spacer 130, a locking housing 180, an inner housing 160, and an o-ring 115. Accordingly, the body of the outer barrel 110 may be made of a single material and may comprise an o-ring slot 116 (also referred to as an "outer barrel o-ring slot"), a micro wedge slot 111 (also referred to as an "outer barrel micro wedge slot"), a coupling element 112 configured to securably couple with an inner housing 160 (also referred to as an "outer barrel coupling element"), and a coupling element 113 configured to securably couple with a locking housing 180 (also referred to as an "locking housing coupling element").

The outer barrel 110 may be configured to physically couple with an o-ring 115. The outer barrel o-ring slot 116 may comprise a radial slot that has a depth that is smaller than the diameter of an o-ring 115 so that the o-ring 115 may sit in the o-ring slot 116 and at least a portion of the o-ring 115 may physically couple a second component. For example, the outer barrel 110 may comprise an o-ring slot 116 located near the front end of the outer barrel 110 that is designed to fit snugly with an inner housing 160 when the outer barrel coupling element 112 is engaged with the outer barrel coupling element 161 of the inner housing 160. However, the front edge of the outer barrel 110 may not create an air-tight or water-tight seal with the inside surface of the inner housing 160. Accordingly, a top portion of the o-ring 115 may extend from the o-ring slot 116 and may physically couple with the inside surface portion of the inner housing 160 to create an air-tight and water-tight coupling between the outer barrel 110 and the inner housing 160. Such a coupling can be seen in FIGS. 2 and 3 where the o-ring 115 is physically touching both the outer barrel 110 and the inner housing 160.

The body of the outer barrel 110 may be configured to physically couple with a spacer 130 through a micro wedge mechanism. Accordingly, the body of the outer barrel 110 may further comprise a micro wedge slot 111 that is configured to engage a micro wedge 131 of a spacer 130 (also referred to as an "outer barrel micro wedge"). The outer barrel micro wedge slot 111 may be the same as described above in reference to the inner barrel micro wedge slot 121. Accordingly, the micro wedge mechanism may operate the same as that described above in reference to the inner barrel micro wedge mechanism, however, as shown in FIGS. 2 and 3, the radial direction of extension may be inverted between the inner barrel micro wedge 132 and the outer barrel micro wedge 131. The coupling or connecting of the outer barrel micro wedge 131 and the outer barrel micro wedge slot 111 will be described in more detail below in reference to FIGS. 4-5B.

Additionally, the outside surface of the outer barrel 110 and the inner housing 160 may be configured to be physically and securably coupled using coupling elements 112, 161 (also referred to as "outer barrel coupling elements" as they are configured to physically couple the outer barrel 110 to the inner housing 160 of the lens assembly). The outer barrel coupling elements 112, 161 may comprise any suitable set of coupling mechanisms. For example, the outer barrel coupling elements 112, 161 may be configured with a unique pattern of teeth, threads, or ridges such that the coupling element 112 on the outer barrel 110 and the coupling element 161 on the inner housing 160 match and engage one another when rotated into one another.

Further, the outer barrel 110 and the locking housing 180 may be configured to be physically coupled using coupling elements 113, 181 (also referred to as "locking housing coupling elements" as they are configured to physically couple the locking housing 180 to the outer barrel 110). The locking housing coupling elements 113, 181 may comprise any suitable set of coupling mechanisms. For example, the locking housing coupling elements 113, 181 may be configured with a unique pattern of teeth, threads, or ridges such that the coupling element 113 on the outer barrel 110 and the coupling element 181 on the locking housing 180 match and engage one another when rotated into one another. The locking housing 180 and the outer barrel 110 may lock into place once the locking housing coupling element 113, 181 are fully engaged. Further, once the locking housing 180 and the outer barrel 110 are fully engaged, the outer barrel 110, spacer 130, and inner housing 160 may be locked and fortified from movement and the locking housing 180 may need to be removed before the other elements may be decoupled or disengaged. The inner housing 160 and the outer barrel 110 may lock into place once the locking housing coupling elements 113, 181 are fully engaged.

The coupling elements 112, 113 of the outer barrel 110 may be the same or different types, sizes, shapes, and configurations. Further, both the outer barrel coupling element 112 and the locking housing coupling element 113 may be located on the exterior or outside surface of the body of the outer barrel 110 with the outer barrel coupling element 112 being positioned at the rear edge of the outer barrel 110 and the locking housing coupling element 113 being positioned at the front edge of the outer barrel 110. Further, in some embodiments, the coupling elements 112, 113 may be positioned at different radial diameters such that the outer barrel coupling element 112 is located at a smaller diameter position than the locking housing coupling element 113. The larger diameter of the locking housing coupling element 113 allows the locking housing 180 to securably engulf, abut, and/or block the front edge of the inner housing 160 to ensure a physical coupling or connection between the locking housing 180 and the inner housing 160 when fully engaged.

Figure 4:
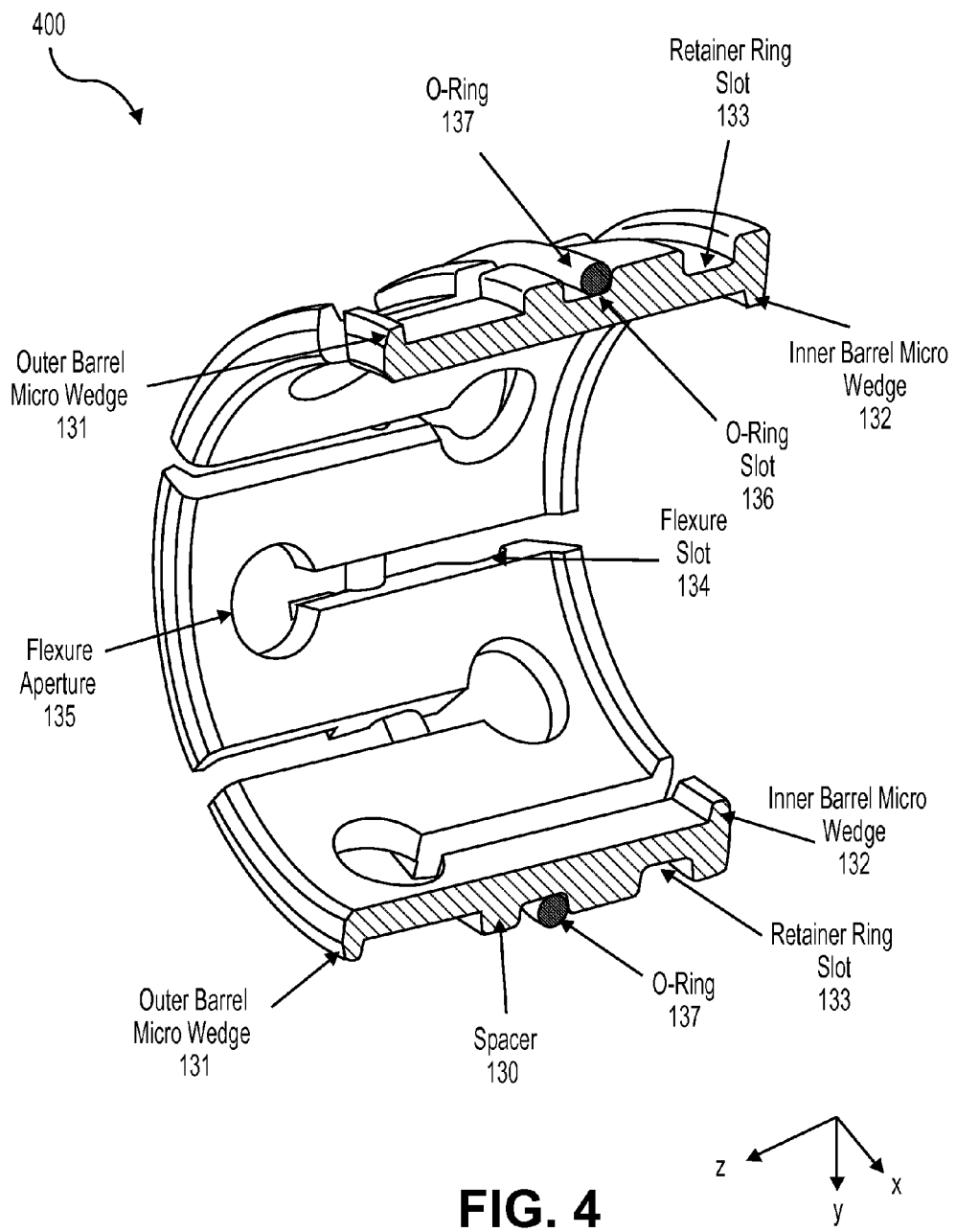
FIG. 4 shows a perspective view of a cross-section of a flexured spacer, according to an exemplary embodiment of the present technology.
Figure 5:
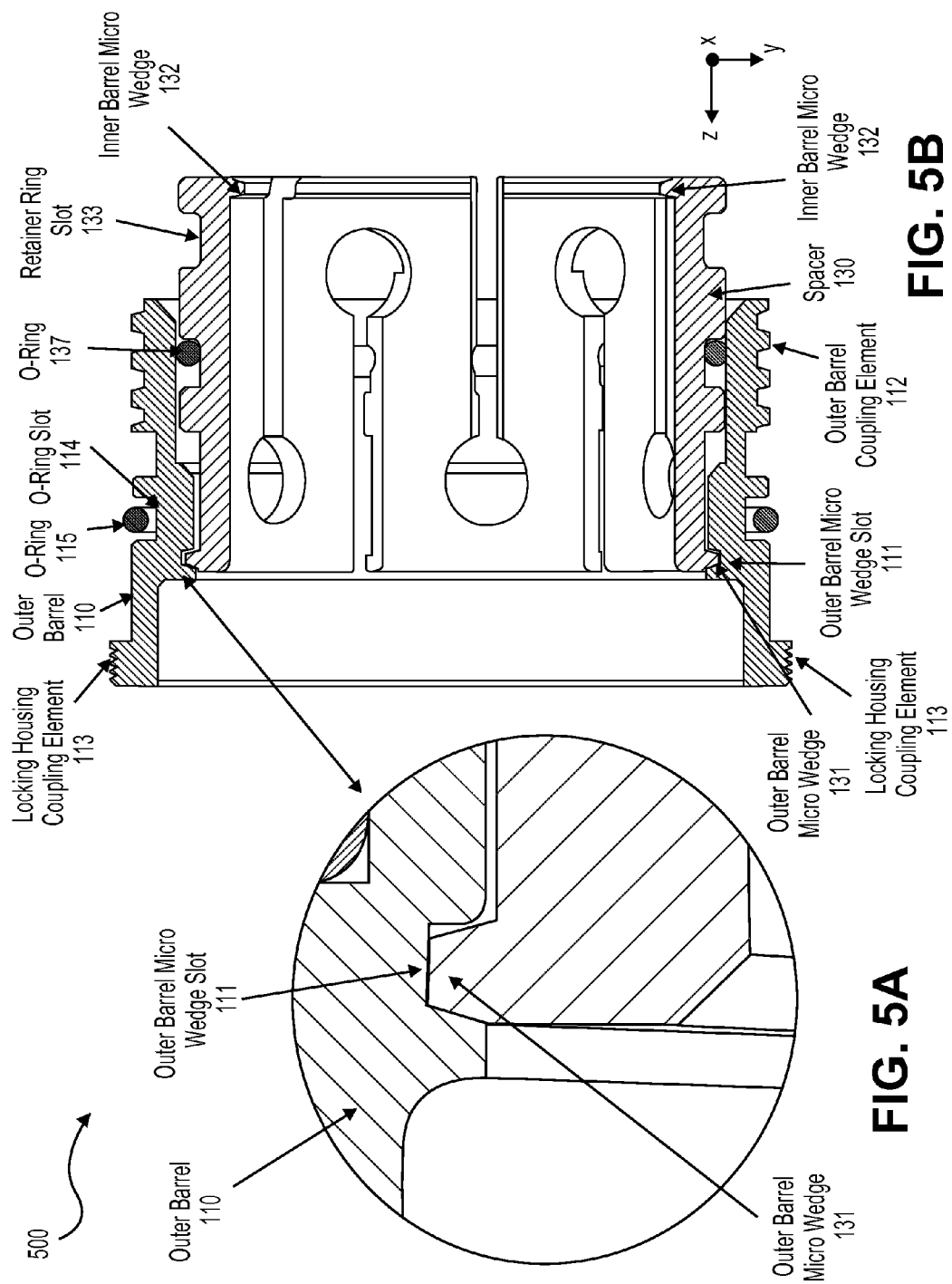
FIG. 5A shows a close-up view of an elevational cross-section of a micro wedge snapping mechanism connection between a spacer and an outer barrel of a springless athermal lens assembly, according to an exemplary embodiment of the present technology.
FIG. 5B shows an elevational cross-section of a spacer and an outer barrel of a springless athermal lens assembly, according to an exemplary embodiment of the present invention.
Figure 6:
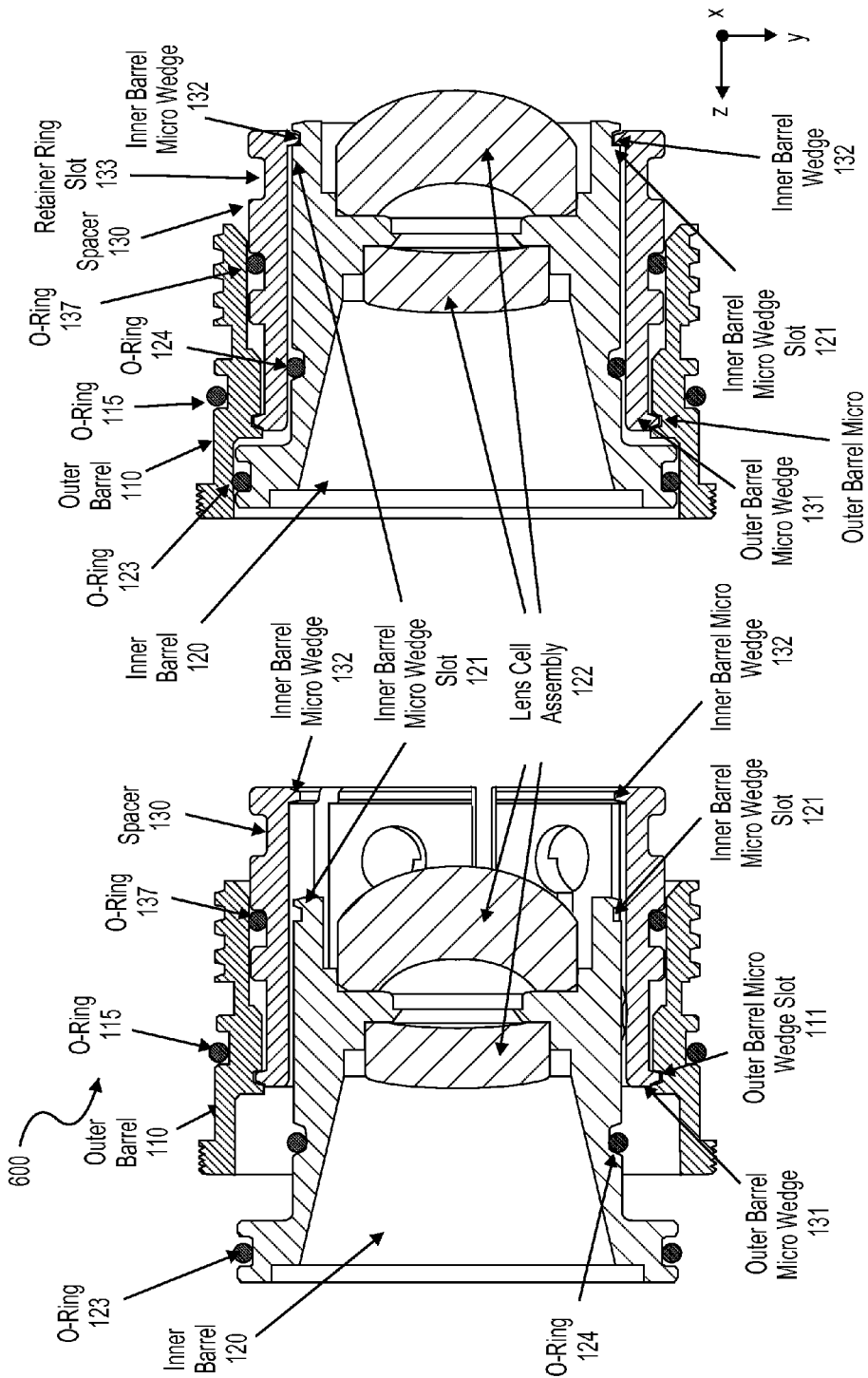
FIGS. 6A and 6B show an elevational view of a cross-section of a springless athermal lens assembly, according to an exemplary embodiment of the present technology.

FIG. 4 shows a perspective view of a cross-section 400 of a spacer 130 according to exemplary embodiments. The spacer 130 may be in the shape of a cylindrical ring and may be configured to physically couple to the inner barrel 120, outer barrel 110, and an o-ring 137. The spacer 130 may be long enough to engage both the inner barrel 120 and the outer barrel 110. The spacer 130 may be made of any suitable material including a variety of plastics and/or metals. As explained above, the material of the spacer 130 may be selected based on the design of the camera system 100 including the materials selected for the inner housing 160 and mounting structure 190. Accordingly, specialty materials (e.g., Delrin™) that comprise particular material properties (e.g., coefficients of thermal expansion (CTE)) may be selected in order to maintain the preferred characteristics (e.g., focal point, size, shape, etc.) of the camera system 100 over a specified range of temperatures, pressures, or any other environmental conditions. For example, the spacer 130 may be made of a Delrin® which has a coefficient of thermal expansion (CTE) of $6.8 \times 10^{-5}$ in./in./degree F. Additionally, the CTE of Delrin® is linear across the expected operating temperature range for the optical system.

As shown in FIGS. 2-3, the spacer 130 may be configured to securably couple to both the inner barrel 120 and the outer barrel 110 through micro wedge mechanisms. The spacer 130 may securably couple to an inner barrel 120 through an inner barrel micro wedge mechanism and may securably couple to an outer barrel 110 through an outer barrel micro wedge mechanism. The spacer 130 may have an outer barrel micro wedge 131 extending radially away from the center or vertex of the spacer 130 and an inner barrel micro wedge 132 extending radially towards the center or vertex of the spacer 130. As explained previously, the inner and outer barrel micro wedges 131, 132 may extend any suitable distance such that the extended micro wedge portion is sufficient to engage and lock the micro wedges 131, 132 into micro wedge slots 121, 111 configured into the outer surface of the inner barrel 120 and into the inner surface of the outer barrel 110, respectively.

FIGS. 5A and 5B show an exemplary fully engaged outer barrel micro wedge mechanism. FIG. 5A shows a close-up view an elevation cross-section of the engagement of the outer barrel micro wedge mechanism coupling the spacer 130 and the outer barrel 110. The outer barrel micro wedge mechanism couples an outer barrel micro wedge slot 111 of the outer barrel 110 and an outer barrel micro wedge 131 of the spacer 130. The outer barrel micro wedge 131 may include a roughly perpendicular (i.e., 60-90 degrees) extension from the body of the spacer 130 and may have a roughly rectangular shape. The outer barrel micro wedge slot 111 is configured with a matching roughly rectangular shape to the outer barrel micro wedge 131 and comprises a radial slot with two roughly perpendicular (e.g., between 60-90 degree angle) walls removed from the inner surface of the body of the outer barrel 110 and a flat slot surface. As can be seen in the close up, the outer barrel micro wedge 131 extends radially away from outer surface of the body of the spacer 130 towards the larger diameter inner surface of the outer barrel 110 and fills a slot 111 configured for the micro wedge 131. Once engaged, the outer barrel micro wedge 131 and the outer barrel micro wedge slot 111 may not be easily disengaged. Accordingly, the wedge 131 and slot 111 may securably couple the outer barrel 110 to the spacer 130. A similar mechanism but with the inner barrel micro wedge 132 extending in a reversed or inverse direction may be used to securably couple the spacer 130 to the inner barrel (not shown). As such, the spacer 130 may be securably coupled to both the inner barrel 120 and the outer barrel 110 through the use of a wedge and slot mechanism.

The extended end portion of the micro wedge 131 and the slot 111 may have matching blunt edges in order to ensure secured coupling between the wedge 131 and the wedge slot 111 as the components shift due to environmental forces (e.g., vibration, expansion due to temperature changes, etc.) and/or installation stresses. Accordingly, the micro wedge 131 and the micro wedge slot 111 may be configured such that as a length of a thermal spacer 130 changes due to temperature changes, the micro wedge 131 may stay securably engaged with micro wedge slot 111 and may exert an axial force on the slot 111 to push and pull the outer barrel 110 axially to change the relative distance of the lens cell array 122 and the focal circuit 191 of the mounting structure 190 to compensate for focal point movement due to thermal expansion of the other components in the camera system 100. An opposite axial force may be exerted on the inner barrel through the inner barrel micro wedge mechanism 132, 121 which causes the inner barrel 120 and outer barrel 110 to shift in opposite axial directions (i.e., along different directions on the z axis) and compensates for defocus of the camera system 100.

As can be seen in FIGS. 2-3, for the inner and outer barrel micro wedge mechanism, the micro wedges and the slots are configured such that once engaged, the micro wedge and slot are securably connected and not easily separated. The inner barrel micro wedge 132 extends towards the center or vertex of the spacer 130 and toward the outer surface of the inner barrel ring while the outer micro wedge portion 131 extends radially away from the center or vertex of the spacer 130 ring and toward the inner surface of the outer barrel 110.

Accordingly, as explained previously, the inner barrel 120 and the outer barrel 110 comprise slots 121, 111 that match in depth with the extended portion of the micro wedge 131, 132 and are of sufficient magnitude to lock the micro wedge portion within the slot portion once engaged. In fact, once engaged, the micro wedge and slot may make a "snap" sound or may snap closed such that a user can feel and/or hear when the spacer 130 is engaged with the inner barrel 120 and outer barrel 110. Additionally, the micro wedges and slots of both the inner and outer wedge mechanisms extend radially 360 degrees around the inner barrel 120, outer barrel 110, and spacer 130 such that a secure connection is made.

The spacer 130 may further comprise a slot 136 that is configured to engage with an o-ring 137 (also referred to as a "spacer o-ring slot"). The o-ring slot 136 is similar to those described above in relation to the o-ring slots 125, 126, 116 of the inner barrel 120 and outer barrel 110 and may physically couple or connect to the inside surface of the outer barrel 110 similarly to the o-rings 123, 124, 115 described above.

Returning to FIG. 4, in some embodiments, the spacer 130 may comprise flexures to facilitate a press fit between the inner barrel 120 and the outer barrel 110. Accordingly, in such embodiments, the spacer 130 may be referred to as a flexured spacer 130. The flexure design allows the spacer 130 to be more flexible to fill the space between the inner barrel 120 and the spacer 130 and the outer barrel 110 and the spacer 130, as close as possible. Additionally, the flexured spacer 130 may better withstand stress forces during installation, manufacturing, or making of the lens assembly. A solid spacer 130 may yield plastically due to installation stresses and temperature changes. Accordingly, a flexured spacer 130 may be capable of withstanding more stress forces during installation and use of the lens assembly 101.

The flexured spacer 130 includes one or more slots 134 extending axially from an edge of the flexured spacer 130. These slots 134 may be referred to as flexure slots. FIG. 4 shows a flexured spacer 130 that includes alternating flexure slots 134 extending axially away from each respective edge of the spacer 130. The flexure slots 134 extend greater than half the length of the flexured spacer 130 and the flexure slots 134 are narrow in relation to the radial length of each edge of the spacer 130. As such, a greater number of flexure slots 134 may be formed into the body of the flexure spacer 130. Additionally, the flexure slots 134 are spaced uniformly such that stresses and forces may be borne uniformly across the entire flexured spacer 130.

Furthermore, the flexure slots 134 further comprise circular apertures 135 proximate to an opposite edge of the flexured spacer 130. The circular aperture 135 has a larger diameter than the width of the slot 134. The circular aperture 135 is proximate to the opposite edge of the flexured spacer 130 from the originating flexure slot edge 134. Further, the circular aperture 135 is positioned more than half the axial distance from the originating edge of the flexured spacer 130. The flexure aperture 135 provides additional dispersion of stress forces across the flexured spacer 130 and allows the flexured spacer 130 to further bend radially during installation.

Depending on the materials used to manufacture the spacer 130, different stresses and breaking points may exist for the spacer 130. A specific material (e.g., a Delrin™ plastic) may be used to allow the spacer 130 and the corresponding micro wedge coupling mechanism (e.g., the micro wedge and the micro wedge slot) to expand and contract properly. However, the materials used may have properties that may crack or break during installation as force is applied to the spacer 130 to snap fit the micro wedge and micro wedge slot together. Accordingly, the flexured spacer 130 may provide stress relief during installation. The circular apertures 135 at the end of the flexure slot 134 provide stress relief for the flexured spacer 130 by evenly distributing stress forces so that a flexure does not break during installation.

The flexured spacer body 130 may further comprise a retainer ring slot 133 that is configured to engage with a retainer ring 140. The retainer ring slot 133 is a radial slot with a sufficient depth to securably couple with a retainer ring 140. The walls of the retainer ring slot 133 may be configured to ensure the retainer ring 140 does not slip or decouple from the retainer ring slot 133. The walls of the retainer ring slot 133 may be substantially perpendicular and the bottom edge of the retainer ring 140 may be a flat surface. Alternatively, the bottom edge of the retainer ring 140 may be configured to match the shape of the retainer ring 140. The width of the retainer ring slot 133 may be narrow compared to the axial length of the spacer 130 (e.g., $\frac{1}{12}$ to $\frac{1}{6}$ of the axial length of the spacer 130) and may be configured to match a width of the retainer ring 140.

The retainer ring slot 133 may be positioned proximate to a rear edge of the flexured spacer 130. The outer wall of the retainer ring slot 133 may be positioned inside of the inner wall of the micro wedge such that a radial force from a retainer ring 140 on the retainer ring slot 133 pushes the micro wedge 132 further down into a micro wedge slot 121 to ensure the micro wedge mechanism is fully engaged. Additionally, the depth of the retainer ring slot 133 may not be so deep that the radial difference in the bottom surface of the retainer ring slot 133 and the bottom surface of the flexured spacer 130 is too thin or narrow to bear the radial force applied by a retainer ring 140. Similarly, the diameter of the retainer ring 140 may not be so much smaller than the diameter of the bottom of the retainer ring slot 133 that the radial force causes failure of the body of the spacer 130 between the bottom surface of the retainer ring slot 133 and the inner surface of the spacer 130 to fail or break.

As shown in FIGS. 1-3 and 7, the retainer ring 140 may be in the shape of a torus with the top portion extending radially out of the retainer ring slot 133. The torus shape of the retainer ring 140 may provide a smaller chance of damaging the spacer 130 as the spacer 130 may be made of a special material (e.g., Delrin™) that may be fragile or otherwise vulnerable to sharp edges or other external forces. Additionally, the torus shape of the retainer ring 140 may have a smaller latching force, so that the retainer ring 140 may be removed with less force and thus, may improve the ability to remove the retainer ring 140 during manufacturing or installation without destroying the assembly.

Alternatively, the retainer ring 140 may have the shape of a flat ring and may fit flush within the retainer ring slot 133. The flat ring may provide a secure fit and less of a chance of decoupling or slipping from the retainer ring slot 133.

The retainer ring 140 may further comprise an opening or gap such that the retainer ring 140 does not comprise a full 360 degree ring or cylinder. Accordingly, the retainer ring 140 may not extend a full 360 degrees around the spacer 130 and may have a section removed to allow for easier latching or securing to the spacer 130. The gap or missing radial section in the retainer ring 140 may allow the retainer ring 140 to be secured to the smaller diameter edge of the spacer 130 with less force. Accordingly, the radial gap in the retainer ring 140 may minimize the chances that the retainer ring 140 is damaged or deformed during installation or securing to the spacer 130.

The retainer ring 140 provides additional robustness for shock and vibration as well as for the extreme temperature changes that may be experienced by a camera system 100. For example, the retainer ring 140 ensures that as temperature changes, the micro wedge 132 of the spacer 130 does not expand out of the micro wedge slot 121 of the inner barrel 120. Additionally, the retainer ring 140 ensures that the micro wedge 132 does not expand out of the micro wedge slot 121 due to vibration and other environmental forces. Accordingly, the retainer ring 140 may apply a radial force to the edge of the spacer 130 to ensure a secure fit between the inner barrel micro wedge 132 and the inner barrel micro wedge slot 121. Accordingly, the retainer ring 140 ensures the secure coupling of the micro wedge mechanism between the spacer 130 and the inner barrel 120. Accordingly, the radial force provided by the retainer ring 140 locks the inner barrel micro wedge 132 of the spacer 130 to the inner barrel micro wedge slot 121 of the inner barrel 120.

The athermal lens assembly 101 may further comprise an inner housing 160 (also referred to as a "camera housing"). The inner housing 160 may comprise a barrel housing having an outer barrel coupling element 161 configured to securably couple to the outer barrel 110 and a base physically coupled to the barrel housing. The barrel housing may be in the shape of a ring or hollow cylinder. The inside surface of the barrel housing may comprise an outer barrel coupling element 161 configured to securably couple with the outer barrel 110. The outside surface of the barrel housing may comprise an outer housing coupling element 162 configured to securably couple to an outer housing 150. As explained previously, the coupling elements 162, 151 may be configured to use any threads, ridges, teeth, series of edges, or other coupling mechanism such that the respective coupling elements 162, 151 match or lock into place with one another to securably couple the respective components.

The outer housing 150 may comprise a ring or hollow cylinder configured to couple with the outer housing coupling element 162 of the inner housing 160 as shown in FIGS. 2 and 3. As such, the inner housing 160 may have a diameter that is smaller than the outer housing 150. Similarly, the outer barrel 110 may have a diameter that is smaller than the inside surface of the barrel housing of the inner housing 160.

The base may be configured to securably couple to a mounting structure 190 and may be in the shape of a plane or flat surface that protects the sensitive circuit card of the camera circuit 191 or focal circuit of the camera system 100. The base may comprise one or more mounting pins 164A-164B or other coupling mechanisms that may allow the inner housing 160 to couple to the mounting structure 190 at a precise position or relative distance from each other. Additionally, the inner housing 160 may be securably coupled to the mounting structure 190 comprising a focal circuit card 191 at a distance where an image passing through the lens cell assembly 122 is focused on the camera circuit 191, focal circuit, or other image receiving device of the mounting structure 190.

The locking housing 180 may include a cylindrical ring that comprises a locking housing coupling element 181 configured to securably couple to the locking housing coupling element 113 of the outer barrel 110. The locking housing 180 may be a lock-down retaining ring that locks the whole lens assembly 100 in place. Accordingly, the locking housing 180 locks the various components of the lens assembly 100 into place so that they cannot move around, shake, or rattle during shock and vibration events. Accordingly, the locking housing 180 may add additional robustness and structural rigidity to the lens assembly 100 and/or camera system 100.

As explained above, the locking housing 180 comprises a locking housing coupling element 181 (e.g., a thread) that may be located at the inside edge of the inside surface of the locking housing 180. The locking housing coupling element 181 may be configured to physically and securably couple with a matching locking housing coupling element 113 positioned on the outer surface of the tip or edge of the outer barrel 110.

The outer housing 150 may include a ring of a larger diameter than the inner housing 160 and may comprise an outer housing coupling element 151. The outer housing coupling element 151 may be configured similarly to other coupling elements described herein (e.g., outer barrel coupling elements). Accordingly, a detailed description may not be provided herein. The outer housing 150 may be used to attach or physically couple the lens assembly 101 to an external housing (not shown). For example, the athermal lens assembly 101 may be coupled to a security camera housing or other suitable application.

FIGS. 6A and 6B show an elevational view 600 of a cross-section of a springless athermal lens assembly 101, according to an exemplary embodiment of the present technology. FIG. 6A shows an inner barrel 120 of the springless athermal lens assembly 101 before it is snapped into place using the snapping inner barrel micro wedge 132 and slot 121 mechanism connection between a spacer 130 and the inner barrel 120. FIG. 6B shows the springless athermal lens assembly 101 after being snapped into place using the inner barrel micro wedge 132 and slot 121 mechanism. The elements and features disclosed in FIGS. 6A and 6B are the same as those described above in reference to the described figures and the numbering of the elements is the same. Accordingly, please refer to the above description regarding the operation and design of the springless athermal lens assembly 101.

Figure 7:
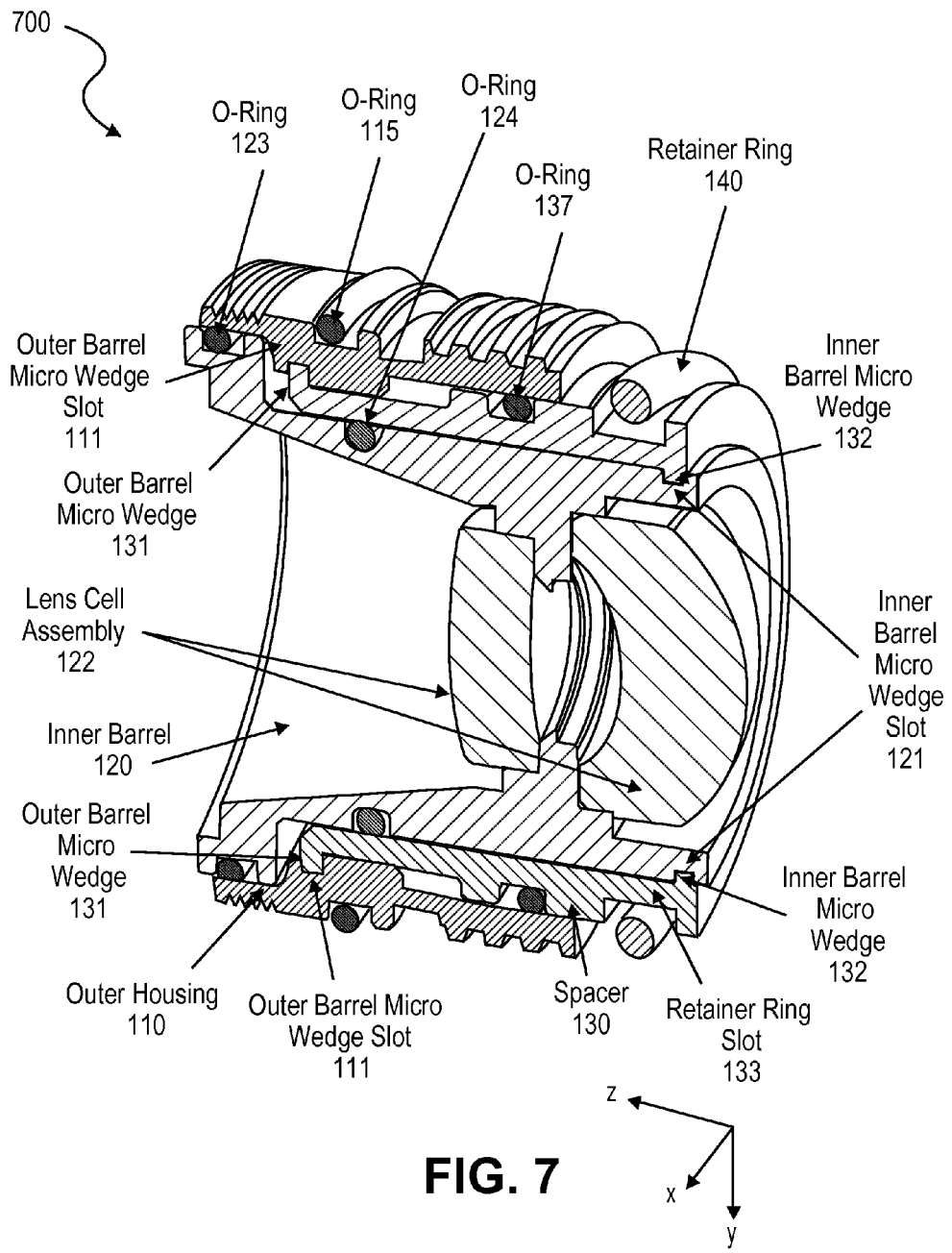
FIG. 7 shows a perspective view of a cross-section of a springless athermal lens assembly independent of a housing, according to an exemplary embodiment of the present technology.

FIG. 7 shows a perspective view of a cross-section 700 of a springless athermal lens assembly 101 independent of a housing, according to an exemplary embodiment of the present technology. The elements and features disclosed in FIG. 7 are the same as those described above in reference to the described figures and the numbering of the elements is the same. Accordingly, please refer to the above description regarding the operation and design of the springless athermal lens assembly 101. FIG. 7 merely shows the springless athermal lens assembly 101 independent of the inner housing 160 and the outer housing 150 so that the operation of the inner 120 and outer barrels 110 and the spacer 130 may be seen.

FIGS. 8A-8H show a series of perspective views at different stages of a method of making, manufacturing, or installing an athermal lens assembly 101, according to embodiments of the present invention. A method of making an athermal lens assembly 101 may include connecting a spacer 130 comprising an inner barrel micro wedge 132 and an outer barrel micro wedge 131 to an outer barrel 110 comprising an outer barrel micro wedge slot 111 to form an intermediate assembly and connecting the intermediate assembly to an inner barrel 120 comprising a lens cell assembly 122 and an inner barrel micro wedge slot 121.

Before the steps shown in FIGS. 8A-8H may be initiated, the components of the athermal lens assembly 101 may be manufactured, purchased, collected, or otherwise obtained by one or more parties. The various components of the athermal lens assembly 101 may be manufactured using any suitable processing including die-casting and/or injection molding. Accordingly, the components may be pre-manufactured and the assembly or installation of the athermal lens assembly 101 may be simplified by the use of the snap fit design.

Steps 1-3 show the process of connecting a spacer 130 comprising an inner barrel micro wedge 132 and an outer barrel micro wedge 131 to an outer barrel 110 comprising an outer barrel micro wedge slot 111 to form an intermediate assembly.

At step 1, as shown in FIG. 8A, the method begins with a separate outer barrel 110 and flexured spacer 130. Accordingly, a first step may include connecting the outer barrel 110 and the flexured spacer 130 by pushing or exerting a force along an axial direction (e.g., z axis) to one of the two components (FIG. 8A shows the spacer 130 being pushed toward the outer barrel 110) or both of the components. The diameter of the spacer 130 is smaller than the outer barrel 110 so the spacer 130 is configured to slide into the outer barrel 110. Further, the relevant o-rings 115, 137 may be positioned in the o-ring slots of the respective components before sliding them together.

At step 2, as shown in FIG. 8B, the flexured spacer 130 is slid into the outer barrel 110 and in some embodiments, the edge of the spacer 130 including the flexured edges may touch a tapered area within the outer barrel 110 such that a radial force is exerted against the outer barrel micro wedge 131 of the spacer 130. The radial force may push and/or bend the flexured edges of the flexured spacer 130 toward the center or vertex of the cylinder or ring. Accordingly, although the diameter of the edge of the flexured spacer 130 may equal or be larger than the diameter of the tapered inner surface of the outer barrel 110, the spacer 130 may still be slid into the outer barrel 110. Accordingly, the connection of the flexured spacer 130 with the outer barrel 110 may bend the one or more flexure slots 134 extending axially from an edge of the flexured spacer 130 radially inward (shown by numeral 2) and provide sufficient bend for the outer barrel micro wedge 131 of the spacer 130 to continue to push into the outer barrel 110.

At step 3, as shown in FIG. 8C, the flexured spacer 130 is slid until the outer barrel micro wedge 131 connects and securably couples with the outer barrel micro wedge slot 111. The outer barrel micro wedge 131 snaps (shown by numeral 3) into the micro wedge slot 111 and the spacer may not further slide into or out of the outer barrel 110 due to the micro wedge slot 111 securely engaging the micro wedge 131. Accordingly, the flexured spacer 130 and the outer barrel 110 are securably coupled through the micro wedge mechanism.

Steps 4-6 show connecting the intermediate assembly to an inner barrel 120 comprising a lens cell assembly 122 and an inner barrel micro wedge slot 121.

Figure 8D:
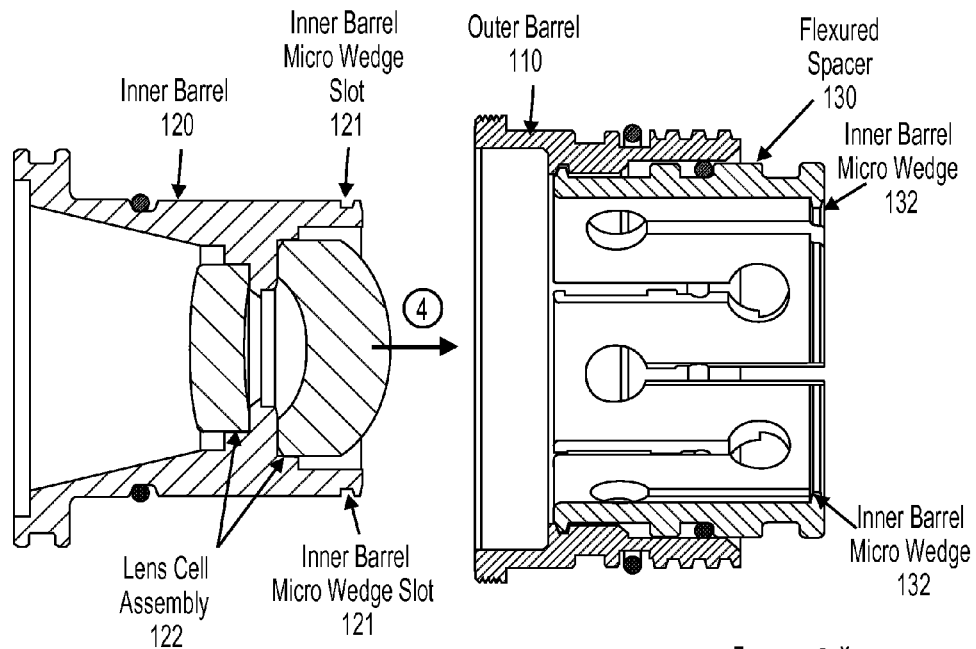

At step 4, as shown in FIG. 8D, now the separate inner barrel 120 and the intermediate assembly of the securably coupled flexured spacer 130 are slide toward each other. Accordingly, the method continues by connecting the outer barrel 110 and the intermediate assembly by pushing or exerting a force along an axial direction (e.g., -z axis) to one of the two components or both of the components. The diameter of the inner barrel 120 is smaller than the spacer 130 of the intermediate assembly so the inner barrel 120 is configured to slide into the spacer 130. Further, the relevant o-rings 124, 123 may be positioned within the o-ring slots of the respective components before sliding them together.

Figure 8E:
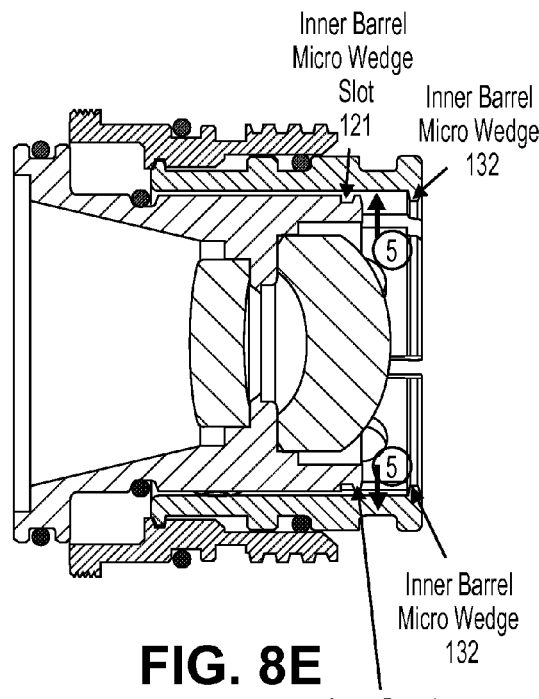

At step 5, as shown in FIG. 8E, the inner barrel 120 is slid into the intermediate assembly and the edge of the inner barrel 120 may touch or connect to the flexured edges of the spacer 130 such that an outward radial force is exerted against flexured edges of the spacer 130. The radial force (shown by numeral 5) may push and/or bend the flexured edges of the flexured spacer 130 away the center of the cylinder. Accordingly, although the diameter of the edge of the flexured spacer 130 may equal or be larger than the diameter of the outer surface of the inner barrel 120 (especially when the end of the inner barrel 120 connects with the inner barrel micro wedge 132 of the flexured spacer 130), the inner barrel 120 may still be slid into the flexured spacer 130. Accordingly, the connection of the flexured spacer 130 with the outer barrel 110 may bend the one or more flexured slots 134 extending axially from an edge of the flexured spacer 130 radially outward and provide sufficient space for the inner barrel 120 to continue to push into the flexured spacer 130 (or intermediate assembly).

Figure 8F:
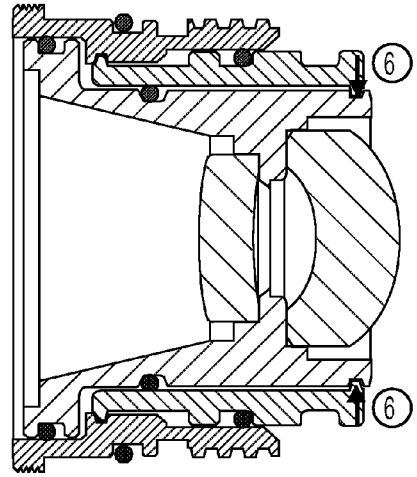

At step 6, as shown in FIG. 8F, the inner barrel 120 slides until the inner barrel micro wedge 132 of the flexured spacer 130 securably couple with the inner barrel micro wedge slot 121 of the inner barrel 120. The inner barrel micro wedge 132 snaps (shown by numeral 6) into the micro wedge slot of the inner barrel 120 and the inner barrel 120 may not further slide into the flexured spacer 130 barrel due to the micro wedge slot 121 securely engaging with the micro wedge 132. The flexured spacer 130 now securably snaps into a fixed position when connected to both the inner barrel 120 and the outer barrel 110.

At step 7, as shown in FIG. 8G, a retainer ring 140 is secured to a retainer ring slot 133 of the flexured spacer 130. The retainer ring 140 provides a radial force (shown by numeral 7) to the edge of the spacer 130 and the radial force further securely locks the inner barrel micro wedge 132 with the inner barrel micro wedge slot 121. The retainer ring 140 adds robustness and additional security to the flexured spacer 130 micro wedge coupling with the inner barrel 120 for rugged applications (e.g., military or adventure applications). Once the spacer 130 is snapped into place with the inner barrel 120 through the micro wedge mechanism, the rear edge of the flexured spacer 130 may be locked in place by engaging with the retainer ring 140.

At step 8, as shown in FIG. 8H, the outer barrel 110 is connected to an inner housing 160 comprising a base configured to be physically coupled to a mounting structure 190. The outer barrel 110 may be coupled to the inner housing 160 by applying a rotational force (shown by numeral 8) to the inner barrel 120 to engage the outer barrel coupling elements 112, 161 of the inner housing 160 and the outer barrel 110. A mounting pin 164B may also be coupled to a mounting structure 190 to ensure a focal point of the lens cell assembly 122 is fixed in relation to a camera or focal circuit card 191 coupled to the mounting structure 190 across a specified range of temperatures.

Furthermore, additional steps may be included which are not shown in FIGS. 8A-8G including the connecting of the locking housing 180 to the outer barrel 110, the connecting of the inner housing 160 to a mounting structure 190, and the connecting of an outer housing 150 to the inner housing 160. These steps may be accomplished through similar steps as those shown in FIG. 8H.

Furthermore, mounting pins 164A-B or other coupling elements may be used to securably couple the inner housing 160 to a mounting structure 190. Additionally, the mounting pins 164A-B may be designed such that the focal point of the lens cell assembly 122 is located on a focal circuit 191 or other electrical sensor for capturing images. Accordingly, the axial length of the mounting pins may be designed such that a precise axial distance between the lens assembly 101 and the mounting structure 190 is achieved.

Note that the order in which the inner barrel 120, the spacer 130, and the outer barrel 110 are connected may be reversed such that the inner barrel 120 and the spacer 130 are connected to create an intermediate assembly. Thereafter, the outer barrel 110 and the intermediate assembly may be connected to create the snap fit between the inner barrel 120, the spacer 130, and the outer barrel 110.

Additionally, note that principles from this design may be used in lens assemblies much smaller or much larger than the current embodiments. For example, the same principles may be applied to a MEMS design but the components would be much smaller. Similarly, a similar design could be applied in a much larger application (e.g., a high powered telescope).

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

As used herein and in the appended claims, the singular forms "a", "an", and "the" include plural references unless the context clearly dictates otherwise. Thus, for example, reference to "a compressor" includes a plurality of such devices, and reference to "the subsystem" includes references to one or more subsystems and equivalents thereof known to those skilled in the art, and so forth.

What is claimed is:

1. A springless athermal lens assembly comprising:
   an inner barrel comprising:
      a lens cell assembly; and
      an inner barrel body;
   an outer barrel comprising an outer barrel body;
   a spacer comprising a spacer body having an inner surface and an outer surface, wherein the outer surface of the spacer body is configured to be physically coupled to the outer barrel body and the inner surface of the spacer body is configured to be physically coupled to the inner barrel body; and
   a retainer ring, wherein the retainer ring is configured to engage with the outer surface of the spacer body and provide a radial force against the outer surface of the spacer body to securably engage the inner surface of the spacer body with the inner barrel body.

2. The springless athermal lens assembly of claim 1, wherein the radial force provided by the retainer ring locks the spacer to the inner barrel.

3. The springless athermal lens assembly of claim 1, wherein the inner barrel further comprises an o-ring positioned to physically couple between the inner barrel and the spacer.

4. The springless athermal lens assembly of claim 1, wherein the spacer further comprises an o-ring positioned to physically couple between the spacer and the outer barrel.

5. The springless athermal lens assembly of claim 1, further comprising an inner housing comprising:
   a barrel housing having an outer barrel coupling element configured to securably couple to the outer barrel; and
   a base physically coupled to the barrel housing, the base configured to securably couple to a mounting structure.

6. The springless athermal lens assembly of claim 1, wherein the outer barrel further comprises a first locking housing coupling element, wherein the lens assembly further comprises:
   a locking housing comprising a second locking housing coupling element, the second locking housing coupling element being configured to engage the first locking housing coupling element, wherein the locking housing is configured to be securably coupled to the outer barrel through engagement of the first and second locking housing coupling elements.

7. The springless athermal lens assembly of claim 1, wherein the spacer is made of a material having a coefficient of thermal expansion from $20\times10^{-6}$ to $200\times10^{-6}$.

8. The springless athermal lens assembly of claim 1, wherein the spacer is a flexured spacer, and wherein the flexured spacer includes one or more slots extending axially from an edge of the flexured spacer.

9. The springless athermal lens assembly of claim 8, wherein the one or more slots of the flexured spacer further comprise a circular aperture proximate to an opposite edge of the flexured spacer.

10. The springless athermal lens assembly of claim 1, wherein the outer barrel is configured to securably couple to an inner housing, wherein the inner housing is physically coupled to a mounting structure comprising a focal circuit card.

11. An athermal camera system comprising:
    a mounting structure comprising:
       a focal circuit card; and
       a springless athermal lens assembly comprising:
          an inner housing comprising:
             a barrel housing; and
             a base physically coupled to the barrel housing, the base configured to securably couple to the mounting structure;
          an inner barrel comprising:
             a lens cell assembly; and
             an inner barrel body;
          an outer barrel comprising an outer barrel body;
          a spacer comprising a spacer body having an inner surface and an outer surface, wherein the outer surface of the spacer body is configured to be physically coupled to the outer barrel body and the inner surface of the spacer body is configured to be physically coupled to the inner barrel body; and
          a retainer ring, wherein the retainer ring is configured to engage with the outer surface of the spacer body and provide a radial force against the outer surface of the spacer body to securably engage the inner surface of the spacer body with the inner barrel body.

12. The athermal camera system of claim 11, wherein a focal point of the lens cell assembly is positioned on the focal circuit card.

13. The athermal camera system of claim 11, wherein the radial force provided by the retainer ring locks the spacer to the inner barrel.

14. A method of making an athermal lens assembly, the method comprising:
    connecting a spacer comprising a spacer body having an inner surface, an outer surface, and a retainer ring slot to an outer barrel comprising an outer barrel body to form an intermediate assembly;

connecting the intermediate assembly to an inner barrel comprising a lens cell assembly and an inner barrel body; and securing a retainer ring to the retainer ring slot of the spacer, wherein the retainer ring provides a radial force against the outer surface of the spacer body to securably engage the inner surface of the spacer body with the inner barrel body.

15. The method of claim 14, wherein the spacer is a flexured spacer, wherein the flexured spacer comprises one or more slots extending axially from an edge of the flexured spacer, and wherein the edge of the flexured spacer is configured to bend radially during connection with the inner barrel and the outer barrel.

16. The method of claim 14, wherein the flexured spacer securably snaps into a fixed position when connected to both the inner barrel and the outer barrel.

17. The method of claim 14, wherein the radial force locks the spacer to the inner barrel.

18. The method of claim 14, further comprising connecting the outer barrel to an inner housing comprising a base configured to be physically coupled to a mounting structure.

19. The method of claim 18, wherein a focal point of the lens cell assembly is fixed in relation to a focal circuit card coupled to the mounting structure across a specified range of temperatures.

20. The method of claim 18, further comprising connecting the outer barrel to a locking housing, wherein the locking housing securably locks the inner housing and the outer barrel.

* * * * *